United States Patent
Tonon et al.

(10) Patent No.: US 10,176,794 B2
(45) Date of Patent: Jan. 8, 2019

(54) ACTIVE NOISE CONTROL SYSTEM IN AN AIRCRAFT AND METHOD TO REDUCE THE NOISE IN THE AIRCRAFT

(71) Applicant: RUAG SCHWEIZ AG, Emmen (CH)

(72) Inventors: Devis Tonon, Lucerne (CH); David Schmid, Obbürgen (CH); Philippe Niquille, Zug (CH)

(73) Assignee: RUAG Schweiz AG, Emmen (CH)

(*) Notice: Subject to any disclaimer, the term of this patent is extended or adjusted under 35 U.S.C. 154(b) by 0 days.

(21) Appl. No.: 15/927,183

(22) Filed: Mar. 21, 2018

(65) Prior Publication Data
US 2018/0277089 A1   Sep. 27, 2018

(30) Foreign Application Priority Data
Mar. 21, 2017 (CH) .......................... 356/17

(51) Int. Cl.
*G10K 11/178* (2006.01)
(52) U.S. Cl.
CPC ...... *G10K 11/17815* (2018.01); *G10K 11/178* (2013.01); *B64C 2220/00* (2013.01); *G10K 2210/1281* (2013.01); *G10K 2210/301* (2013.01); *G10K 2210/3221* (2013.01);
(Continued)
(58) Field of Classification Search
CPC .......... G10K 11/178; G10K 11/17815; G10K 2210/1281; G10K 2210/3221; G10K 2210/3226; G10K 2210/301; G10K 2210/501; H04R 3/00; H04R 3/005; H04R 3/12; H04R 2410/05; H04R 2499/13; B64C 2220/00
See application file for complete search history.

(56) References Cited

U.S. PATENT DOCUMENTS

| 4,562,589 A | 12/1985 | Warnaka et al. |
| 4,715,559 A * | 12/1987 | Fuller .................. G10K 11/178 244/1 N |
| 4,819,182 A | 4/1989 | King et al. |

(Continued)

FOREIGN PATENT DOCUMENTS

| GB | 2 132 053 | 6/1984 |
| WO | WO 98/06089 | 2/1998 |
| WO | WO 98/16916 | 4/1998 |

OTHER PUBLICATIONS

International Search Report (CH 3562017) dated May 22, 2017.

*Primary Examiner* — Thang V Tran
(74) *Attorney, Agent, or Firm* — Dority & Mannin, P.A.

(57) ABSTRACT

An active noise control system for reducing the sound pressure level in one or more head areas of one or more seats in the interior of an aircraft fuselage includes multiple accelerometers mounted outside of the aircraft fuselage at or near the mounts of the aircraft's propulsion system. One or more loudspeakers are mounted at the seat and are responsible for the reduction of noise at its head area. The accelerometers continuously measure multiple reference signals during operation of the aircraft and report to a controller that continuously calculates the reported noise signals in the head areas based on the measured reference signals and its counter signals, which equal the amplitude but having opposite phase of the calculated arriving noise signals in each head area. The controller operates one or more actuator systems for continuously generating the counter signals.

17 Claims, 3 Drawing Sheets

(52) U.S. Cl.
CPC .............. *G10K 2210/3226* (2013.01); *G10K 2210/501* (2013.01)

(56) References Cited

U.S. PATENT DOCUMENTS

| | | | |
|---|---|---|---|
| 5,219,143 A * | 6/1993 | Staple | B64C 27/001 244/17.11 |
| 5,310,137 A | 5/1994 | Yoerkie, Jr. et al. | |
| 5,568,557 A | 10/1996 | Ross et al. | |
| 5,845,236 A | 12/1998 | Jolly et al. | |
| 6,002,778 A | 12/1999 | Rossetti et al. | |
| 6,138,947 A | 10/2000 | Welsh et al. | |
| 6,343,127 B1 * | 1/2002 | Billoud | G10K 11/178 381/71.4 |
| 7,062,049 B1 | 6/2006 | Inone et al. | |
| 7,383,106 B1 | 6/2008 | Coonse, Jr. | |
| 2008/0019536 A1 * | 1/2008 | Marrot | G10K 11/178 381/71.4 |
| 2013/0163774 A1 | 6/2013 | Maeda | |
| 2016/0284337 A1 | 9/2016 | Inoue | |

\* cited by examiner

ACTIVE NOISE CONTROL SYSTEM IN AN AIRCRAFT AND METHOD TO REDUCE THE NOISE IN THE AIRCRAFT

TECHNICAL FIELD

The invention relates to an apparatus and a method for an Active Noise Control system in an aircraft for reducing the sound pressure level in one or more head areas of one or more seats in the interior of an aircraft fuselage of the aircraft with mounts to a propulsion system.

BACKGROUND OF THE INVENTION

Active Noise Control (ANC) systems are well known. They reduce unwanted noise in a room, such as in a car, by emitting a second noise with the same amplitude but inverted phase in that particular space. The original noise and the emitted noise cancel each other widely, which results in a lower sound pressure level.

Lower frequency noise is difficult to cancel by passive sound reduction means such as porous absorption material, since this should have a thickness of about a fourth of the wavelength to reduce, which is, at normal conditions for temperature and pressure, 85 cm at 100 Hz, but only 4 cm at 2000 Hz. Low frequencies are also very penetrating and travel long distances. On the other hand, the long wavelength of the lower frequencies is a benefit when using ANC: in a large area, like the head area of a passenger, the variation of the phase of the sound pressure level is small. By emitting the anti-sound to this area, the resulting noise in these low frequencies is greatly reduced. At high frequencies, on the other hand, the same local field comprises a high number of wave maxima and minima which cannot be compensated by interference sound waves of a single source, since the directions of sound propagation and anti-sound propagation is usually not coincident.

Several ANC systems for aircrafts are known in U.S. Pat. No. 5,310,137, which is hereby incorporated herein by this reference for all purposes, an ANC system for a helicopter is described for cancellation of high frequency noise. It comprises modified transmission beams with several mounting fixtures on which a plurality of force generating actuators and a plurality of sensors are mounted. Using this method, the structure borne noise can be cancelled right at the source. The problem is to calculate the anti-noise in a very short time.

At U.S. Pat. No. 4,819,182, which is hereby incorporated herein by this reference for all purposes, electro hydraulic actuators are mounted between the fuselage and the rack structure supporting the gearbox and the rotor of a helicopter to apply a vertical force to the fuselage that is reacted by an equal and opposite force on the rack.

The document U.S. Pat. No. 6,138,947, which is hereby incorporated herein by this reference for all purposes, describes an ANC system for a helicopter, where the input information is measured by a plurality of microphones or accelerometers arranged in the cabin above the heads of the passengers building a sub-system. For cancellation of the noise a plurality of actuators is arranged on each flange between the gear box and the cabin structure, generating the anti-noise.

Other ANC Systems described in U.S. Pat. No. 5,568,557, US 2016/0284337 and in U.S. Pat. No. 7,062,049, which are hereby incorporated herein by this reference for all purposes, use microphone and speakers, which are all mounted within the passenger cabin such as in the seats or in the trim, in a roof panel or to the rear shelf of a car for example.

SUMMARY OF THE INVENTION

It is the object of the invention to describe an ANC system well adapted to aircrafts like airplanes but in particular to helicopters, which increase the acoustic comfort of the passengers and/or pilots during flight, if possible even if the seats are moved to different positions. It is a further object of the invention to describe a method to reduce the sound pressure level in such aircrafts during flight. The objects are solved by the apparatus and methods described more fully below.

It has been found that the noise penetration in aircrafts differs largely from such in cars. Not only that the absolute sound pressure levels are much higher in aircrafts, but also the source differs. While in a car the noise is originated by the engine, the transmission, the exhaust system and the wheels, in an aircraft such as a helicopter or an airplane the main noise propagates from the propulsion system through a rack structure to the passenger cabin.

The system according to the invention includes a plurality of sensors with accelerometers mounted outside of the interior of the aircraft fuselage at or near the mounts. Moreover, according to the invention, each of the seats is equipped with its own actuator system, which comprises one or more loudspeakers mounted at the seat and responsible for the reduction of noise at the respective head area of the seat.

The apparatus and method of the present invention more easily counteracts changes in the noise that result from changes in the seat positioning, orientation or location. Because when a seat's position, orientation or location is changed, the noise canceling sounds broadcast at the head area of the seat are commensurately changed.

The benefit of such a system is that the time span between the measurement of the reference signals and the arrival of these signals at the head areas is relatively long. During this time span, the counter signals can be calculated by the controller and transmitted to the loudspeakers, which timely emit them for destructive interference with the sound waves of the original noise at each head area.

In the method according to the invention, during operation of the aircraft the multiple accelerometers continuously measure the reference signals and transfer them to the controller. Further, the controller continuously calculates the arriving noise signals in the one or more head areas based on the said measured reference signals and calculates its counter signals, which equal the amplitude but have opposite phase of the calculated arriving noise signals in each head area. The controller transmits the counter signals to the loudspeakers, which accordingly continuously reproduce these counter signals timely to achieve a destructive interference in the one or more head areas with the sound pressure level originated at the propulsion system. The loudspeakers of one seat are responsible to reduce the noise at the head area of the same seat only.

The advantage of this system and the said method is that improved results can be achieved. The system and the method of the present invention further allows the option to move the seats and/or to change seat positions without any major reduction of the noise cancelling effect.

Further, integrating the actuator systems with their loudspeakers in the seat or, preferably, more precisely the seat headrest, makes the system perfectly suitable for retrofitting. Further, due to the short distance of the actuator system to the head area, the number of loudspeakers can be reduced, especially in case of the relatively high frequencies which are characteristic for helicopters.

BRIEF DESCRIPTION OF THE DRAWINGS

In the following, the invention is described referring to the figures which show.

BEST MODE FOR CARRYING OUT THE INVENTION

Figure 1:
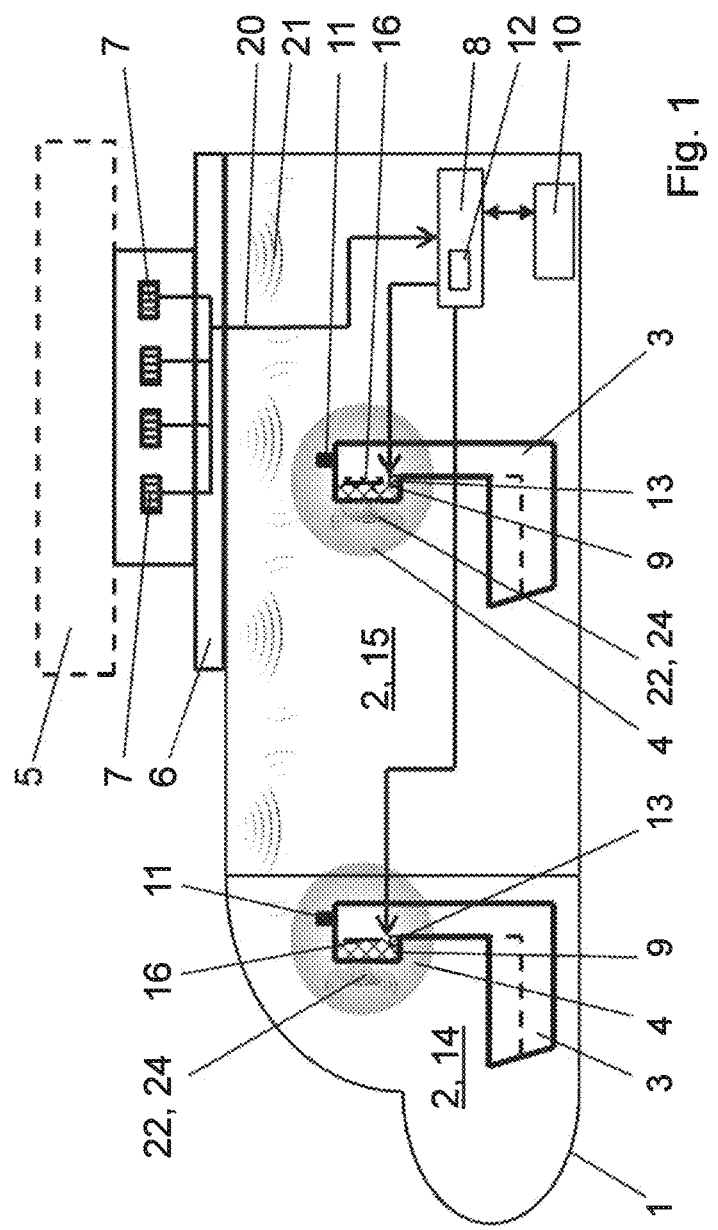
FIG. 1 a schematic graph in sectional view of a part of an aircraft comprising an embodiment of the inventive system.

The FIG. 1 shows a section of an aircraft fuselage 1 with an interior 2 of the aircraft, comprising a cockpit 14 and a passenger compartment 15 with seats 3. Each seat 3 comprises a head area 4, where a passenger or a crew member would have his or her head during flight operation of the aircraft. The seats 3 can be one or more passenger seats in the passenger compartment 15 or crew seats in the cockpit 14 of the aircraft fuselage 1. The aircraft comprises a propulsion system 5, not shown in detail in FIG. 1 but disposed to the exterior of the fuselage 1.

The propulsion system 5 of the aircraft can be a rotor, if the aircraft is a helicopter, or a driving mechanism such as a propeller or turbine engine, if the aircraft is an airplane. The propulsion system 5 is mounted to the aircraft fuselage 1 with mounts 6, which can comprise a rack attached to the exterior of the fuselage 1. The noise originated by the propulsion system 5 passes through the mounts 6 and the aircraft fuselage 1, before being radiated to the interior of the aircraft 2 and arriving eventually at the head areas 4 of the seats 3.

The ANC system according to the invention is mounted in the aircraft for reducing the sound pressure levels in one or more head areas 4 of the one or more seats 3 in the interior 2 of the aircraft fuselage 1. The ANC system comprises multiple sensors 7 for continuously measuring multiple reference signals 20 during operation of the aircraft. According to the invention, the multiple sensors 7 are accelerometers mounted outside of the interior 2 of the aircraft fuselage 1 at or near the mounts 6. The movements detected by the sensors 7 result in the multiple reference signals 20 electrically generated by the sensors 7. By the application of suitable transfer functions to these reference signals 20, it is possible to obtain the mechanical sound signals 21 that are caused by the detected mechanical movements and are predicted to infiltrate into the interior of the aircraft fuselage 1 in the head areas 4 of the seats 3. The ANC system includes a controller 8 for continuously calculating the arriving mechanical noise signals 21 in the one or more head areas 4 based on the measured reference signals 20. The controller 8 is also configured for calculating counter signals 22, which equal the amplitude but having opposite phase of the calculated arriving noise signals 21 in each head area 4. The ANC system further comprises one or more actuator systems 9 operated by the controller 8 for continuously generating the calculated counter signals 22. According to the invention, each actuator system 9 comprises one or more loudspeakers mounted at each of the one or more seats 3 and configured to broadcast sounds that cancel the noise expected to arrive at the respective head area 4 of the respective seat 3 due to the noise generated by the propulsion system of the aircraft and thus the respective head areas 4 will be supplied with anti-noise.

Figure 4:
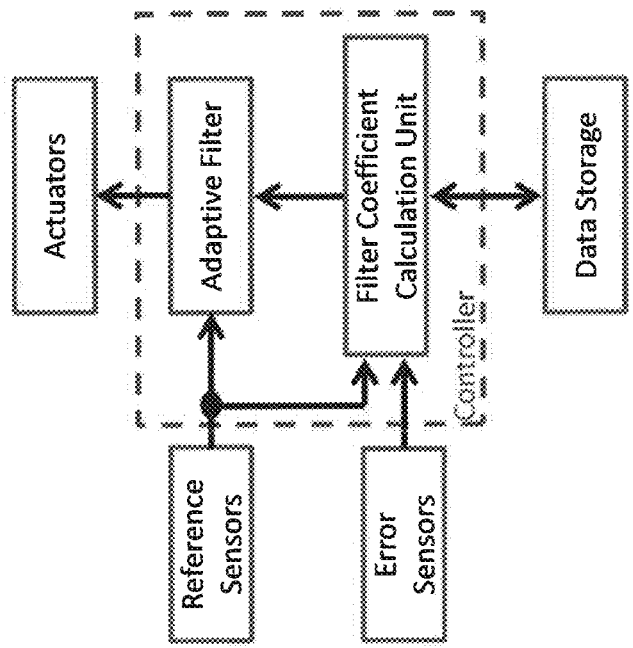
FIG. 4 a schematic representation of a second embodiment according to the invention.
Figure 3:
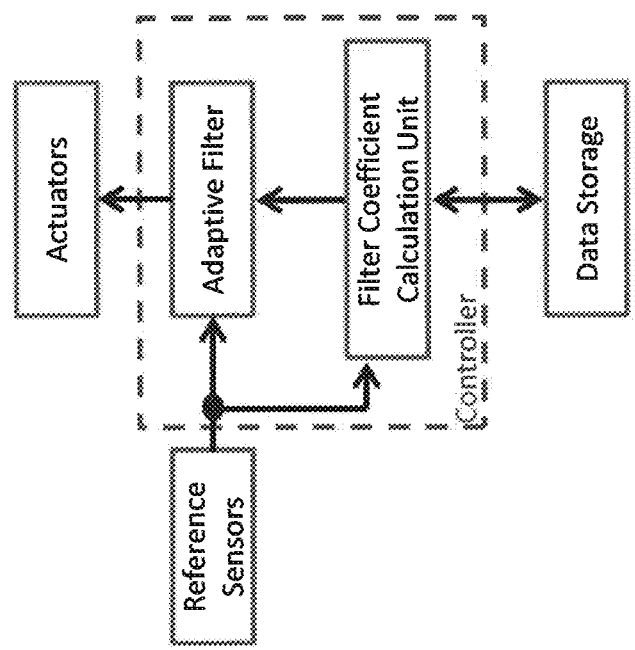
FIG. 3 a schematic representation of a first embodiment according to the invention.

Preferably, the controller 8 of the ANC system comprises a data storage 10 on which transfer functions from each accelerometer mounting point 7 to each head area 4 are stored. Alternatively, as schematically shown in FIGS. 3 and 4, a data storage 10 can be connected in communication with the controller 8. In each case, the controller 8 is calculating the arriving noise signals 21 at the head areas 4 by multiplying the measured reference signals 20 with the according transfer functions. The counter signals 22 equal these calculated arriving noise signals 21 but having opposite phases. As schematically shown in FIGS. 1, 3 and 4, the controller 8 sends electrical signals to each of the loudspeakers 9 that cause the loudspeakers 9 to generate the mechanical counter signals 22. By superposing the original arriving noise signals 21 and the counter signals 22 generated by the loudspeakers 9, the two signals 21, 22 compensate each other at least in part and result in a reduced sound pressure level 24 at each head area 4.

In contrast to many other systems known, the system and method according to the invention reduce the sound pressure level in relatively small areas around the head areas 4 of passengers or cabin crew members. These head areas 4 have each a volume of between 3000 and 300,000 cm$^3$. Since the system applies its impact to such limited and rather small areas, the acoustic improvement is larger than in conventional methods, which try to reduce the sound pressure level in a large area such as in almost the entire cabin interior.

In a preferred version, the controller 8 further comprises a subsystem 12 comprising a spectrum analyser. For spectrum analysis, usually a Fourier Transformation has to be performed. This subsystem 12 is capable to receive the calculated arriving noise signals 21 from the controller 8 in each head area 4 and can analyse frequencies of tonal noise 23 (FIG. 2) in each of these head areas 4. Further, the subsystem 12 or the controller 8 can calculate counter noise 24 of said frequencies, which then are superposed with the calculated counter signals 22 of each head area 4, for further reducing the sound pressure levels in the frequencies of tonal noise 23. The use of this preferred system is also very effective in noise cancellation.

As schematically shown in FIGS. 1 and 4, an improved system according to the invention further comprises at least one error sensor 11 in each head area 4. Each error sensor 11 is an acoustic sensor, in particular a microphone or a pressure sensor. Preferably, these error sensors 11 are integrated in the seats 3. Each error sensor 11 detects the measured sound pressure level in the head area 4 and reports same to the controller 8. In a preferred version, the controller 8 further comprises a subsystem 12, which can be the same subsystem 12 as mentioned before. The subsystem 12 is further configured to analyse frequencies of tonal noise 23 of the signals submitted by the error sensors 11. Based on this information, the subsystem 12 or the controller 8 can calculate the counter noise 24 of said frequencies and can superpose the calculated counter signals 22 with the calculated counter noise 24, for further reducing the sound pressure levels in the tonal noise 23 frequencies at each head area 4. The use of this improved system is further effective in noise cancellation. For the given reasons, the subsystem 12 may comprise an FFT algorithm, its inverse, and/or algorithms for spectrum analysis.

The subsystem 12 can use both, the calculated arriving noise signals 21 and the sound pressure levels measured by the error sensors 11 for identifying the tonal noise 23, or using one of the input options alone.

Figure 2:
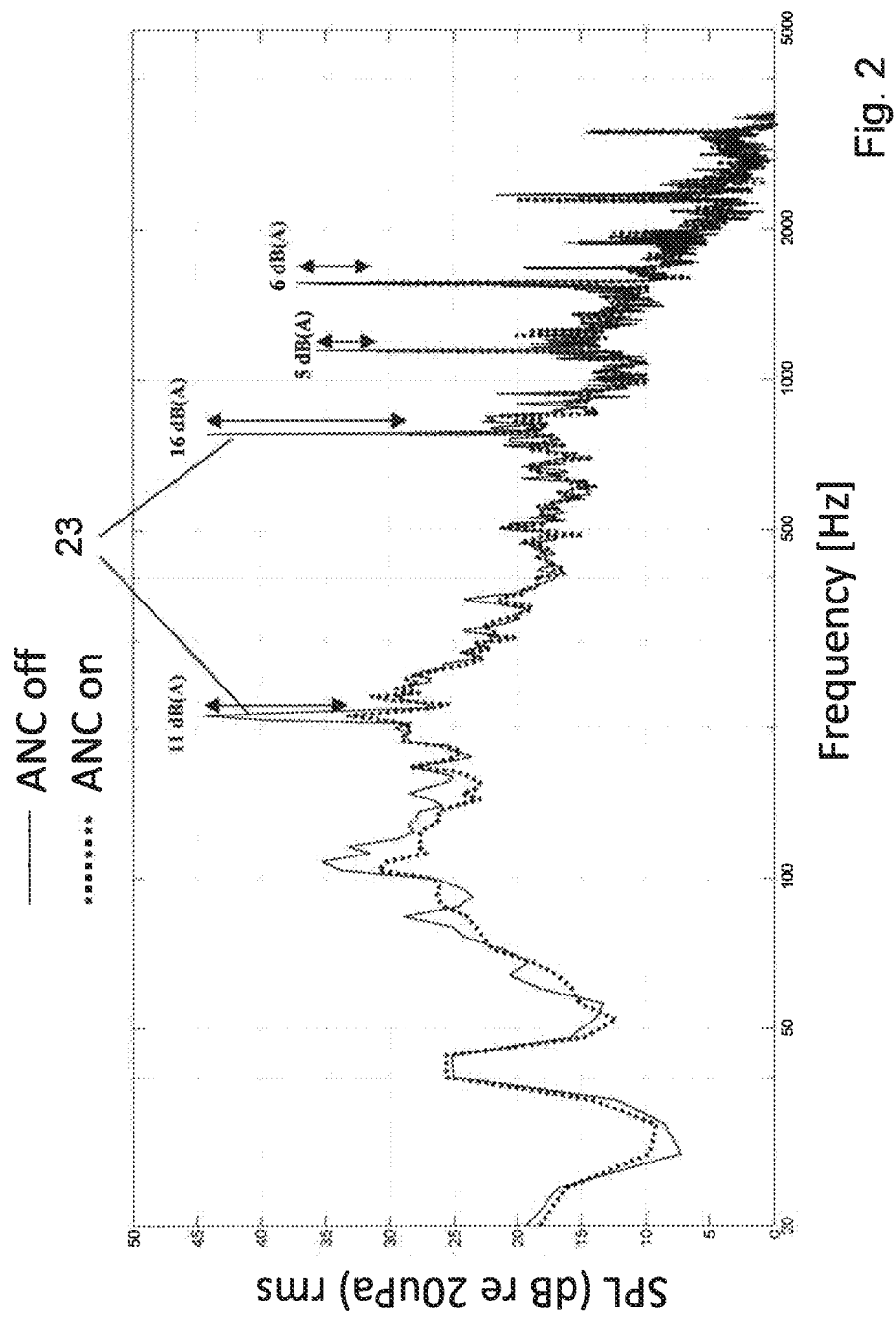
FIG. 2 an example of the sound pressure level in the head area of a seat in an aircraft without and with the inventive ANC system applied.

FIG. 2 shows an example of the effectiveness of the system in use. The continuous line represents the sound pressure level measured at a head area 4 without the operation of the ANC system of the present invention. The dotted line represents the same measured sound pressure level while operating the ANC system of the present invention. In the example given, the system is most useful in frequencies up to about 1500 Hz. In particular, tonal noise at about 220 Hz, 700 Hz, 1100 Hz and 1500 Hz can be reduced by 5-16 dB(A), as shown in FIG. 2.

It has been found out that it was also very useful to combine the ANC system with the on board electronic system used for communication and entertainment. For this reason, the loudspeakers 9 of the inventive system further comprise an audio input interface 13 for receiving audio input such as from a microphone in the cockpit 14, from a telephone, a radio or a television, or from a storage medium. This saves additional weight and installation work of a separate audio system and features excellent sound and communication quality.

Preferably, the one or more loudspeakers 9 are distributed mode loudspeakers comprising panels 16 with electro-acoustic exciters for introducing vibration into the panels 16. Such panels can easily be integrated in the seats, such as in rigid headrest surfaces.

Since the actuator systems 9 and the error sensors 11 are integrated in the seats 3, the seats 3 can be moved or changed in their comfort position without reducing the benefit of the ANC system.

With any of the ANC systems described, the method according to the invention for reducing the sound pressure level 21 in one or more head areas 4 of one or more seats 3 in the interior 2 of a said aircraft can be applied. During operation of the aircraft the multiple accelerometers 7 continuously measure the reference signals 20 and transfer them to the controller 8, which continuously calculates the arriving noise signals 21 in the one or more head areas 4 based on the said measured reference signals 20 and further calculates its counter signals 22, which equal the amplitude of the calculated arriving noise signals 21 in each head area 4 but have opposite phase. The controller 8 transmits electrical signals representing the counter signals 22 to the one or more loudspeakers 9 which continuously reproduce the counter signals 22 timely to achieve a destructive interference in the one or more head areas 4 with the arriving noise signals 21 originated at the propulsion system 5. This reduces the sound pressure level at the head areas 4 noticeably.

The method applied on a said ANC system comprising the subsystem 12 may further comprise the steps that the subsystem 12 receives the calculated arriving noise signals 21 from the controller 8 and analyzes frequencies of tonal noise 23 in each head area 4, that the subsystem 12 or the controller 8 calculates the counter noise 24 of said frequencies and superposes the calculated counter noise 24 with the calculated counter signals 22, which are submitted to the loudspeakers 9 for further reducing the sound pressure level in the tonal noise frequencies at each head area 4.

The method applied on a said ANC system comprising the said error sensors 11 and the subsystem 12 may further or alternatively comprise the steps that the subsystem receives signals from the at least one error sensor 11 and analyzes frequencies of tonal noise 23 in each head area 4. Further, the subsystem 12 or the controller 8 calculates the counter noise 24 of said frequencies and superposes the calculated counter noise 24 with the calculated counter signals 22, which are submitted to the loudspeakers 9 for further reducing the sound pressure levels in the tonal noise frequencies at each head area 4.

Each method of reducing the sound pressure level in the frequencies of tonal noise 23 can be applied alone or both methods can be applied simultaneously.

Further, the method can be applied to a said ANC system with one or more loudspeakers 9 comprising an audio input interface 13. The method may then comprise the step that the loudspeakers 9 further reproduce signals received at their audio input interfaces 13, for instance from a microphone in the cockpit 14, a telephone, a radio, a television, or from a storage medium.

A preferred controller 8 for a first embodiment of the invention is specified as follows. The reference sensors 7 detect noise and inputs and accordingly generate electrical signals 20 transmitted to the controller 8. The controller 8 includes an adaptive filter and a filter coefficient calculation unit. The controller 8 applies the transfer functions stored in the data storage 10 to the signal 20 from the reference sensors 7 and generates an electrical signal that will be transmitted to the actuators 9 to operate the actuators 9 to generate an anti-noise or counter signal 22. This anti-noise signal 22 generated by the actuators 9 will destructively interfere with the noise 21 in the aircraft creating the noise-control zone in the head area 4 to produce the resulting counter noise 24 in the head area 4. Thus, the controller 8 generates the anti-noise 24 in a way that minimized the noise in the head area 4.

The data storage 10 stores the transfer functions (also called transfer matrices by persons of ordinary skill in this art) between the reference sensors 7 and each head area 4, and between the actuator systems 9 and each head area 4. These transfer functions are evaluated and stored during the ground and flight testing calibration of the ANC system.

The noise 21 predicted according to the transfer functions to infiltrate into each head area 4 is calculated by means of the reference signals 20 generated by the reference sensors 7 and the transfer functions stored in the data storage 10.

As schematically shown in each of FIGS. 3 and 4, the adaptive filter, which can for instance be a Finite impulse Response (FIR) filter, has filter coefficients set by the filter coefficient calculation unit. The filter coefficient calculation unit sets the value of the filter coefficients based on the reference sensors signal 20 and the transfer function data stored in the data storage 10.

A preferred controller for a second embodiment of the invention is specified as follows. The reference sensors 7 detect noise and inputs to the controller 8. The controller 8 includes an adaptive filter and a filter coefficient calculation unit. Based on the reference signal 20 from the reference sensors 7, and the error sensors 11, and the transfer functions stored in the data storage 10, the controller 8 generates an electrical signal that is transmitted to drive the actuators 9 to generate an anti-noise or counter signal 22. This anti-noise signal 22 destructively interferes with the arriving noise 21 to produce an anti-noise or counter noise 24, which creates the noise-control zone in the head area 4. Thus, the controller 8 generates the anti-noise 24 that minimizes the noise in the head area 4.

The data storage 10 stores the transfer functions (also called transfer matrices) between the reference sensors 7 and the error sensors 11, between the actuators 9 and the error sensors 11, and between the error sensors 11 and each head area 4. These transfer functions are evaluated and stored during the ground and flight testing calibration of the ANC system.

The noise 21 near the head area 4 is calculated by means of the signals measured by the error sensors 11, which are disposed near the ears of the user, and the transfer functions stored in the data storage 10.

The adaptive filter, that can for instance be a Finite Impulse Response (FIR) filter, has filter coefficients set by the filter coefficient calculation unit. The filter coefficient calculation unit sets the filter coefficients based on the transfer function data stored in the data storage 10. The filter coefficient calculation unit continuously and successively updates the current filter coefficients stored in the data storage 10 with the calculated coefficients.

The error sensors 11 inputs the detected error sound (noise detected after the reduction) to the filter coefficient calculation unit, so that even though noise environment or the like changes, noise can be minimized at each head area 4, which surrounds the positions of user's ears.

LIST OF REFERENCE NUMERALS

1 Aircraft fuselage
2 Interior of an aircraft
3 Seat
4 Head area
5 Propulsion system
6 Mount
7 Sensors for measuring reference signals, accelerometers
8 Controller
9 Actuator system, loudspeaker, distributed mode loudspeaker
10 Data storage
11 Error sensor
12 Subsystem
13 Audio input interface
14 Cockpit
15 Passenger compartment
16 Panel
20 Reference signals
21 Arriving noise signals
22 Counter signals
23 Tonal noise
24 Counter noise

The invention claimed is:

1. An active noise control system for reducing the sound pressure level in each head area of each of a plurality of seats in the interior of an aircraft fuselage having a propulsion system connected via mounts to the exterior of the aircraft fuselage, the active noise control system comprising:
 a plurality of sensors for continuously measuring multiple reference signals during operation of the aircraft, each of the sensors including an accelerometer mounted outside of the interior of the aircraft fuselage and at or near the mounts;
 a controller connected to the plurality of sensors and configured for continuously calculating from the multiple reference signals measured by the plurality of sensors, a respective noise signal that is indicative of the sound predicted to arrive in each of the head areas due to the motion detected by the accelerometers, the controller being further configured for calculating, based on the noise signal, a respective counter signal, which is indicative of the amplitude of the sound predicted to arrive in each of the head areas due to the motion detected by the accelerometers but having opposite phase of the respective sound predicted to arrive in each of the head areas due to the motion detected by the accelerometers in each head area; and
 a plurality of first actuator systems connected for operation by the controller for continuously generating the counter signals, each of the plurality of first actuator systems including a respective loudspeaker mounted at a respective seat for the reduction of noise at the respective head area of the respective seat.

2. System according to claim 1, wherein the aircraft is a helicopter or an airplane.

3. System according to claim 1, wherein each of the seats is a passenger seat in the passenger compartment of the aircraft fuselage.

4. System according to claim 1, further comprising a data storage connected to the controller and containing transfer functions from each accelerometer mounting point to each head area.

5. System according to claim 1, wherein the controller comprises a subsystem configured to analyze frequencies of tonal noise in each head area based on the calculated arriving noise signals, wherein the subsystem is configured to calculate counter noise of said frequencies of tonal noise and to superpose the calculated counter signals with the calculated counter noise for further reducing the sound pressure levels in the tonal noise frequencies at each head area.

6. System according to claim 1, further comprising an error sensor disposed in each head area.

7. System according to claim 6, wherein the error sensor is an acoustic sensor.

8. System according to claim 6, wherein the error sensor is a microphone.

9. System according to claim 6, wherein the error sensor is a pressure sensor.

10. System according to claim 6, wherein the error sensor is integrated in a seat.

11. System according to claim 6, wherein the controller comprises a subsystem configured to analyze frequencies of tonal noise in each head area based on the calculated arriving noise signals, wherein the subsystem is configured to calculate counter noise of said frequencies of tonal noise and to superpose the calculated counter signals with the calculated counter noise for further reducing the sound pressure levels in the tonal noise frequencies at each head area.

12. System according to claim 1, wherein each of the loudspeakers is loudspeakers comprises a further audio input interface for receiving audio input from one of the following audio generating devices: a microphone in the cockpit, a telephone, a radio, a television, an audio storage medium.

13. System according to claim 1, wherein each of the loudspeakers is a distributed mode loudspeaker comprising panels and electro-acoustic exciters for introducing vibration into the panels.

14. Method for reducing the sound pressure level in a head area of a seat in the interior of an aircraft fuselage of an aircraft with mounts to a propulsion system during operation of the aircraft, the method comprising the steps of:
 using multiple accelerometers deployed at or near the propulsion system of the aircraft so as to continuously measure reference signals;
 transferring the reference signals to a controller;
 using the controller to continuously calculate based on the reference signals, noise signals indicative of the sound predicted to arrive in the head area;
 using the controller to continuously calculate counter signals that are based on the noise signals, wherein the counter signals are indicative of the sound that has equal the amplitude but opposite the phase of the sound predicted to arrive in the head area;

transmitting the counter signals from the controller to a loudspeaker that is disposed to broadcast sound into the head area; and using the loudspeaker to convert the counter signals into sound that is continuously broadcast into the head area to achieve a destructive interference in the head area with any sound arriving in the head area from sound generated at the propulsion system.

15. Method according to claim 14, further comprising the steps of:

using a subsystem to analyze the noise signals to determine frequencies of tonal noise predicted to arrive in the head area;

using the loudspeakers to generate counternoise signals at the determined frequencies of tonal noise predicted to arrive in the head area, for further reducing the sound pressure levels in the tonal noise frequencies at the head area.

16. Method according to claim 14, further comprising the steps of:

using an error sensor to detect the noise signals in the head area;

using a subsystem to analyze the noise signals detected by the error sensor to determine frequencies of tonal noise in the head area;

using the loudspeakers to generate counternoise signals at the determined frequencies of tonal noise in the head area, for further reducing the sound pressure levels in the tonal noise frequencies at the head area.

17. Method according to claim 14, further comprising the step of using an audio input interface to enable the loudspeaker to reproduce signals received at the audio input interface from at least one of the following audio generating apparatus: a microphone in the cockpit, a telephone, a radio, a television, and a storage medium.

* * * * *